US006956699B2

(12) United States Patent
Hong et al.

(10) Patent No.: US 6,956,699 B2
(45) Date of Patent: Oct. 18, 2005

(54) POLARIZER TO IMPROVE CONTRAST FOR LIQUID CRYSTAL DISPLAY FROM DOWN VIEW ANGLE

(75) Inventors: Wei-Duz Hong, Taoyuan (TW); Tung-Lung Li, Taoyuan (TW); Long-Hai Wu, Taoyuan (TW); Ta-Wang Lai, Taoyuan (TW)

(73) Assignee: Optimax Technology Corporation, Taoyuan (TW)

( * ) Notice: Subject to any disclaimer, the term of this patent is extended or adjusted under 35 U.S.C. 154(b) by 0 days.

(21) Appl. No.: 10/706,957

(22) Filed: Nov. 14, 2003

(65) Prior Publication Data

US 2005/0063057 A1    Mar. 24, 2005

(51) Int. Cl.[7] .......................... G02B 5/30; G02B 27/28; G02F 1/1335
(52) U.S. Cl. .................. 359/491; 359/490; 359/601; 359/614; 349/96
(58) Field of Search ................ 359/490, 491, 359/601, 614; 349/96, 194; 362/19

(56) References Cited

U.S. PATENT DOCUMENTS

| | | | | |
|---|---|---|---|---|
| 5,783,299 A | * | 7/1998 | Miyashita et al. | 428/329 |
| 5,909,314 A | * | 6/1999 | Oka et al. | 359/582 |
| 6,147,738 A | * | 11/2000 | Okamoto | 349/122 |
| 6,262,787 B1 | * | 7/2001 | Kamoi et al. | 349/96 |
| 6,395,863 B2 | * | 5/2002 | Geaghan | 528/196 |
| 6,398,371 B1 | * | 6/2002 | Matsunaga et al. | 359/614 |
| 6,419,366 B1 | * | 7/2002 | Namioka | 359/601 |
| 6,542,210 B1 | * | 4/2003 | Wu | 349/119 |
| 6,542,300 B2 | * | 4/2003 | Umemoto | 359/491 |
| 6,552,763 B1 | * | 4/2003 | Kouya | 349/96 |
| 6,600,529 B1 | * | 7/2003 | Kusumoto et al. | 349/96 |
| 6,660,388 B2 | * | 12/2003 | Liu et al. | 428/421 |
| 6,747,720 B2 | * | 6/2004 | Saiki et al. | 349/122 |
| 6,770,352 B2 | * | 8/2004 | Suzuki et al. | 428/142 |
| 6,777,070 B1 | * | 8/2004 | Murata et al. | 428/323 |
| 6,778,240 B2 | * | 8/2004 | Nakamura et al. | 349/112 |

* cited by examiner

Primary Examiner—Ricky D. Shafer
(74) Attorney, Agent, or Firm—Troxell Law Office, PLLC

(57) ABSTRACT

A polarizer to improve contrast for LCD from down view angle is produced by laminating a triacetate cellulose (TAC) sheet on each side of a polyvinyl alcohol (PVA) sheet and further on the toppest triacetate cellulose (TAC) sheet applying a surface-treatment layer that is a protective film formed by black dye mixture to inhibit dark-state light leakage and improve the contrast for LCD from down view angle.

6 Claims, 4 Drawing Sheets

POLARIZER TO IMPROVE CONTRAST FOR LIQUID CRYSTAL DISPLAY FROM DOWN VIEW ANGLE

FIELD FOR THE INVENTION

The present invention is related to a polarizer to improved contrast for LCD. Especially, it means a hardcoat layer (HC layer) and anti-static layer (AS layer) that can form a protective layer with incorporated black dyes in surface treatment during production to inhibit dark-state light leakage and improve contrast for LCD from down view angle.

BACKGROUND OF THE INVENTION

A polarizer that can transmit and block light and a liquid crystal that can modulate light are the basic elements to comprise LCD. LCD application has shifted from calculators and watches in the early time to notebook computers, word processors, LCD projectors, LCD TV, automobile navigators and indoor and outdoor measurement equipment.

View angle is a very unique characteristic for LCD. As shown in FIG. 1 for a LCD panel, after the incident light from a backlight source 7 passes in sequence through a polarizer 6, a glass panel 5, an ITO conductive layer 3, a molecular orientation layer 2 and a liquid crystal layer 1, it illuminates by passing through a molecular orientation layer 2, an ITO conductive layer 3, a color filter 4, a glass panel 5 and a surface-treated polarizer 6. The output light has a specific orientation. That also means most output light from display is in perpendicular direction. If we watch a totally white screen from a very flat angle, we are very likely to see black color or lose color fidelity. Such effect may be usefull under some circumstances, but is undesirable for most applications. Therefore, LCD industry has strived to improve view angle characteristic for LCD.

Further, the LCD industry defines maximum view angle as the view angle to obtain contrast 10:1 (usually in four directions up/down/left/right). Contrast is defined as the ratio of bright-state transmittance (totally white) and dark-state transmittance (totally black). The higher the ratio is, the better the display is. Contrast issue does not exist in CRT display because a CRT display can easily present totally black screen. However, this is very hard for a LCD. The backlight source 7 composed of cold cathode fluorescent lamp (CCFL) can not turn on and off quickly, so the backlight source is always kept on. To obtain a totally black screen, liquid crystal module has to block all the light from backlight source 7. But due to physical characteristics, these components can not meet the requirement and always present light leakage.

As shown in FIG. 2, a traditional polarizer with 6~8 micrometer hardcoat layer (HC layer) is subject to optical measurement for contrast from down view angle. As shown in FIG. 3, a traditional polarizer with 6~8 micrometer anti-static layer (AS layer) is subject to optical measurement for contrast from down view angle. From the figures, it is known that HC polarizer has a contrast 6.1, while AS polarizer has a contrast 7.0. From the area formed by the periphery at 270 degree of the contrast figure and a solid curve, it is known that the enclosed area by the HC layer and the AS layer can not reach a contrast above 10 due to dark-state light leakage. On the other hand, this affects the display characteristic for LCD and results in undesirable applicability.

SUMMARY OF THE INVENTION

The invention is to improve the contrast for LCD from down view angle by developing a polarizer with improved contrast performance. To increase the contrast from down view angle for LCD and inhibit dark-state light leakage, the inventor derived preliminary theoretical principles from the definition of view angle contrast, i.e. increasing contrast by reducing dark-state transmittance.

According to the present invention, a protective layer is formed to inhibit dark-state light leakage when a hardcoat layer and an anti-static layer are produced along with a black dye mixture, so a polarizer to improve the contrast from down view angle is produced.

DETAILED DESCRIPTION OF THE INVENTION

Figure 1:
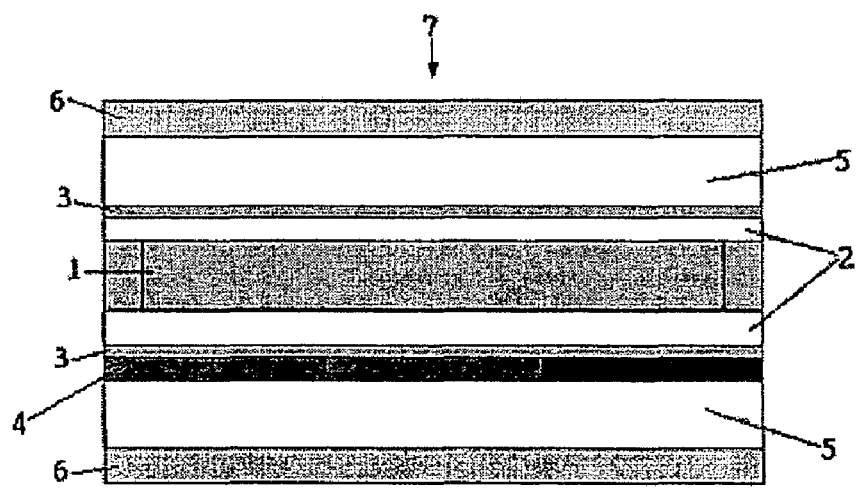
FIG. 1 is the cross-sectional view of a LCD panel.
Figure 2:
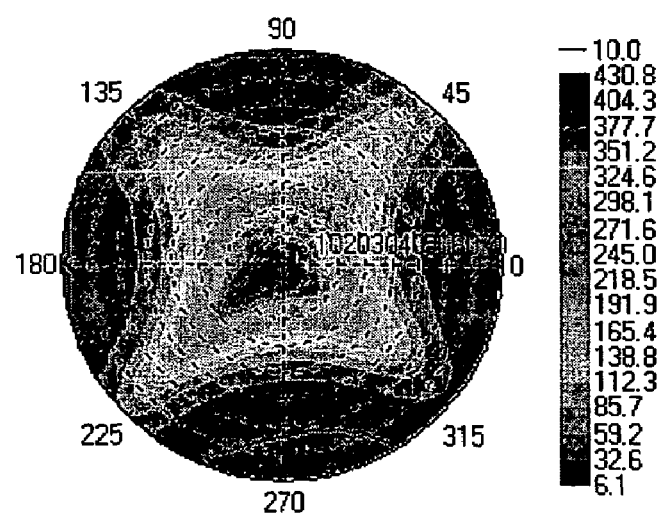
FIG. 2 is the measured contrast from a traditional polarizer with a hardcoat layer.
Figure 3:
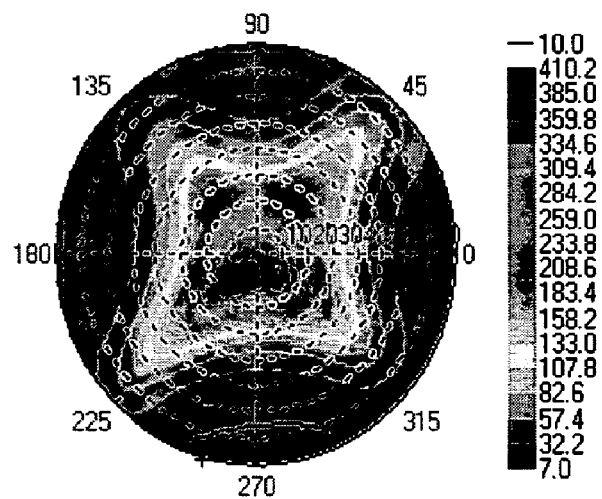
FIG. 3 is the measured contrast from a traditional polarizer with an anti-static layer.
Figure 4:
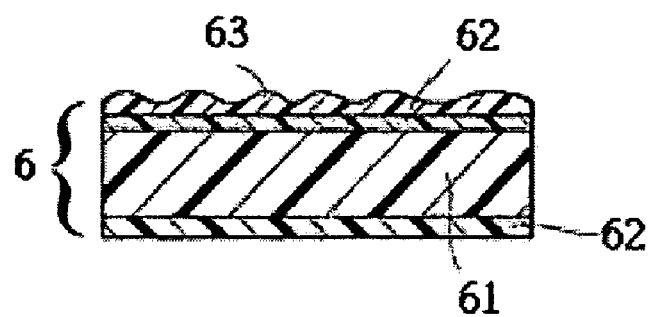
FIG. 4 is the cross-sectional view of the polarizer for the present invention.

Please refer to FIG. 4. The surface treated polarizer 6 is produced by laminating a TAC sheet 62 on each side of a PVA sheet 61 and further applying a surface treatment layer 63 on the toppest TAC sheet 62. The polarizer 6 is to improve contrast from down view angle by inhibiting dark-state light leakage and has a protective coating layer that is formed by mixing black dyes with the surface treatment layer 63.

Figure 5:
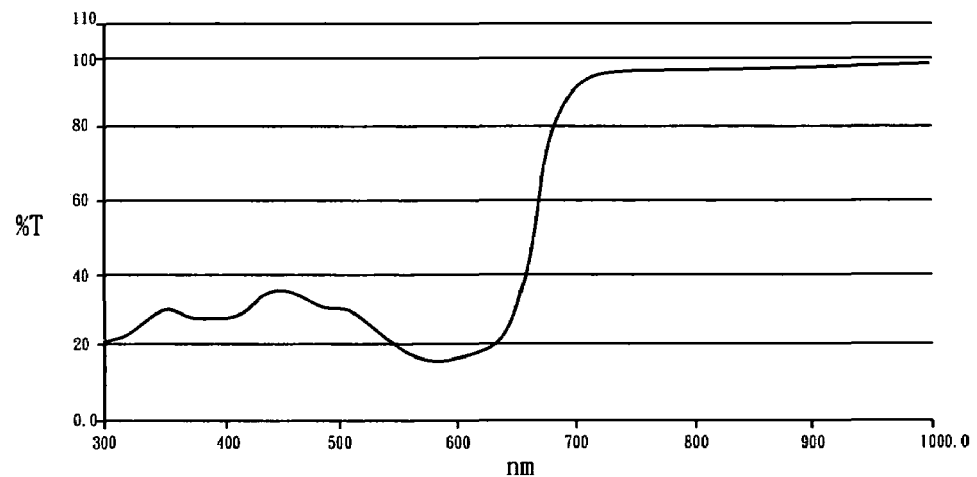
FIG. 5 is the absorbance spectrum for a chromic metal complex dye 2RL and a dye BL.
Figure 5:
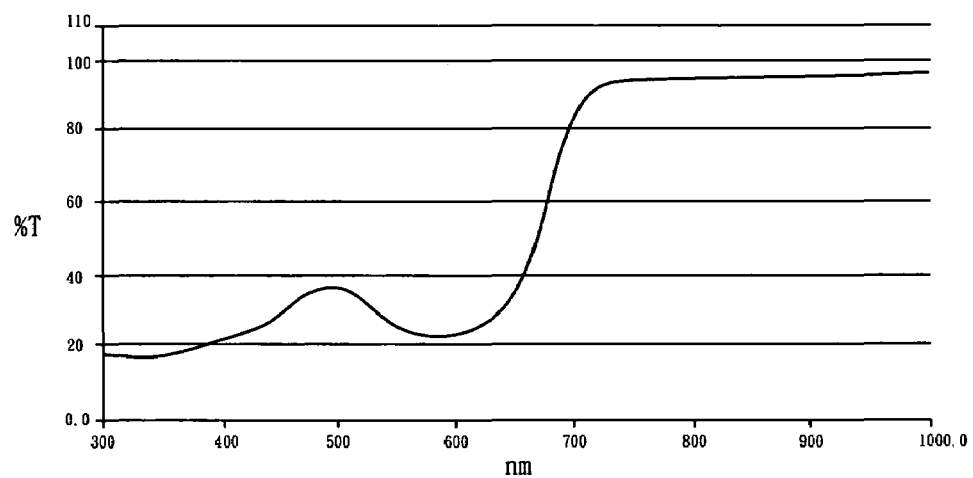

The black dye is a solvent dye. It is an ionic acid chromic metal complex dye, which has an chromic atom attached with two functional groups. Chromic metal complex dye 2RL and BL are examples. From FIG. 5 for the absorbance spectrum of dye 2RL and dye BL, it is know that both dyes show very low trasnmittance in the range 300~700 nm and absorb light significantly. They can work as media to block light from backlight source and inhibit dark-state light leakage.

Examples are given below to further explain the invention but not to limit the claims of the invention.

EXAMPLE 1

Figure 6:
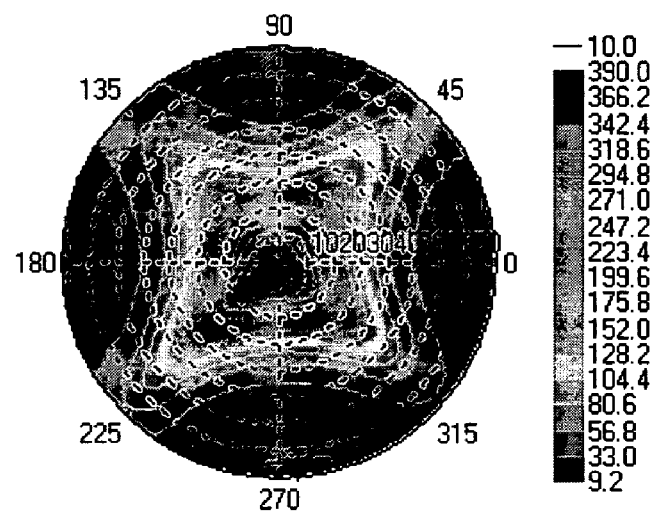
FIG. 6 is the measured contrast for the polarizer with a hardcoat layer for the present invention.

Mix chromic metal complex dye in 0.001%~1% by weight with hardcoat material and prepare a 6~8 micrometer HC layer, which undergoes optical measurement for contrast from down view angle. The result is shown in FIG. 6. It is known from the figure that the contrast is 9.2 (very close to 10). The area enclosed by the periphery at 270 degree of the contrast figure and a solid curve is very small. Thus, dark-state light leakage is improved. The polarizer made in this way can inhibit dark-state light leakage and greatly improve the contrast from down view angle and the LCD performance as well.

EXAMPLE 2

Figure 7:
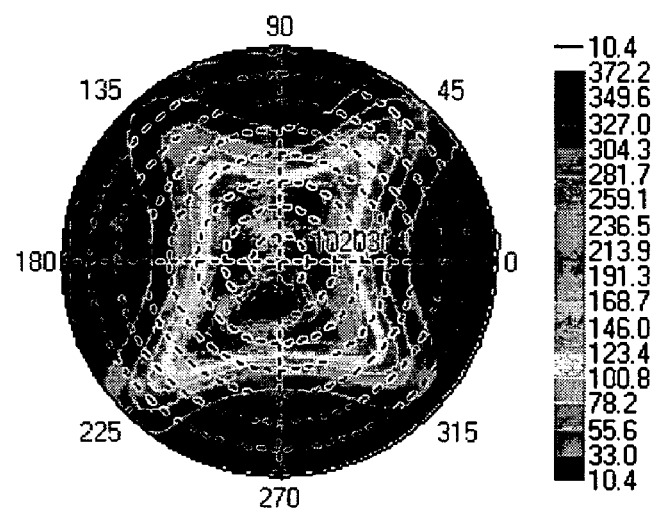
FIG. 7 is the measured contrast for the polarizer with an anti-static layer for the present invention.

Mix chromic metal complex dye in 0.001%~1% by weight with anti-static material and prepare a 6~8 micrometer AS layer, which undergoes optical measurement for contrast from down view angle. The result is shown in FIG. 7. It is known from the figure that the contrast is 10.4 (over 10). No dark-state light leakage is found in the contrast figure. Thus, such polarizer not only completely inhibits dark-state light leakage, but also greatly improve contrast performance from down view angle and the LCD performance as well.

From the above examples, it is clear that by mixing black dye into the surface HC layer or AS layer during production, a protective layer is formed to inhibit dark-state light leakage and further improve LCD performance. The technology is worth being considered as innovation that has a practical industrial value.

What is claimed is:

1. A polarizer to improve contrast for a liquid crystal display (LCD) from down view angle comprising a laminate having a triacetate cellulose (TAC) sheet on each side of a polyvinyl alcohol (PVA) sheet and further on top of one of the triacetate cellulose (TAC) sheets applying a surface-treatment layer that is a protective film formed by a black dye mixture to inhibit dark-state light leakage and improve the contrast of the liquid crystal display (LCD) from the down view angle.

2. The polarizer according to claim 1, wherein the black dye is a solvent dye.

3. The polarizer according to claim 1, wherein the black dye is an ionic acid chromic metal complex dye.

4. The polarizer according to claim 1, wherein the black dye is mixed with the surface treatment material in 0.001%~1% by weight.

5. The polarizer according to claim 1, wherein the surface treatment layer is a hardcoat layer (HC layer).

6. The polarizer according to claim 1, wherein the surface treatment layer is an anti-static layer (AS layer).

* * * * *